United States Patent [19]

Girardin

[11] Patent Number: 4,717,072

[45] Date of Patent: Jan. 5, 1988

[54] SEQUENTIAL VALVE AND DRAIN FOR SNOW GUN

[75] Inventor: Pierre Girardin, Saint Herblain, France

[73] Assignee: Le Froid Industriel York, Carquefou Cedex, France

[21] Appl. No.: 802,043

[22] Filed: Nov. 26, 1985

[30] Foreign Application Priority Data

Nov. 27, 1984 [FR] France ............... 84 18236

[51] Int. Cl.⁴ .............................. E03B 7/20
[52] U.S. Cl. ................... 239/75; 239/415; 137/62; 137/79
[58] Field of Search ............ 74/428; 137/129.11, 137/302, 307, 308, 78.5, 62, 79; 239/8, 25, 14, 570, 310, 311, 413–415, 581, 582, 2.2, 14.2, 582.1, 586, 75

[56] References Cited

U.S. PATENT DOCUMENTS

| | | | |
|---|---|---|---|
| 584,682 | 6/1897 | Garrison | 137/308 |
| 979,941 | 12/1910 | Fuller | 137/308 |
| 1,276,677 | 6/1918 | Yassulcovitch | 137/308 X |
| 3,080,952 | 3/1963 | Carlstedt | 251/129.11 X |
| 3,372,872 | 3/1968 | Le Bus et al. | 239/2 S |
| 3,756,282 | 9/1973 | Knutson | 251/129.11 |
| 3,841,555 | 10/1974 | Lilja | 239/8 |
| 4,128,203 | 12/1978 | Maltby | 137/80 X |
| 4,210,169 | 7/1980 | Palma | 239/570 |
| 4,228,817 | 10/1980 | Weaver | 137/79 |
| 4,503,888 | 3/1985 | Brouold | 251/129.11 X |
| 4,511,083 | 4/1985 | Muller-Girard | 239/75 X |
| 4,545,529 | 10/1985 | Tropeano et al. | 239/2S |

FOREIGN PATENT DOCUMENTS 1128328 7/1982 Canada .................... 239/14.2

Primary Examiner—Andres Kashnikow
Assistant Examiner—Kevin Patrick Weldon
Attorney, Agent, or Firm—Frost & Jacobs

[57] ABSTRACT

A feed device for automatically controlling the operation of a snow gun, the device having an axially displaceable slide to selectively feed air and water under pressure to the snow gun and bleed water from the device, the device incorporating a control system including a geared motor for moving the slide, a conversion module for operating the geared motor in accordance with the outputs of sensors positioned to determine outlet water pressure, temperature and humidity at the site of the snow gun, the conversion module being operatively connected to a central computer adapted to control the operation of a series of snow guns and feed devices located along a ski slope.

9 Claims, 10 Drawing Figures

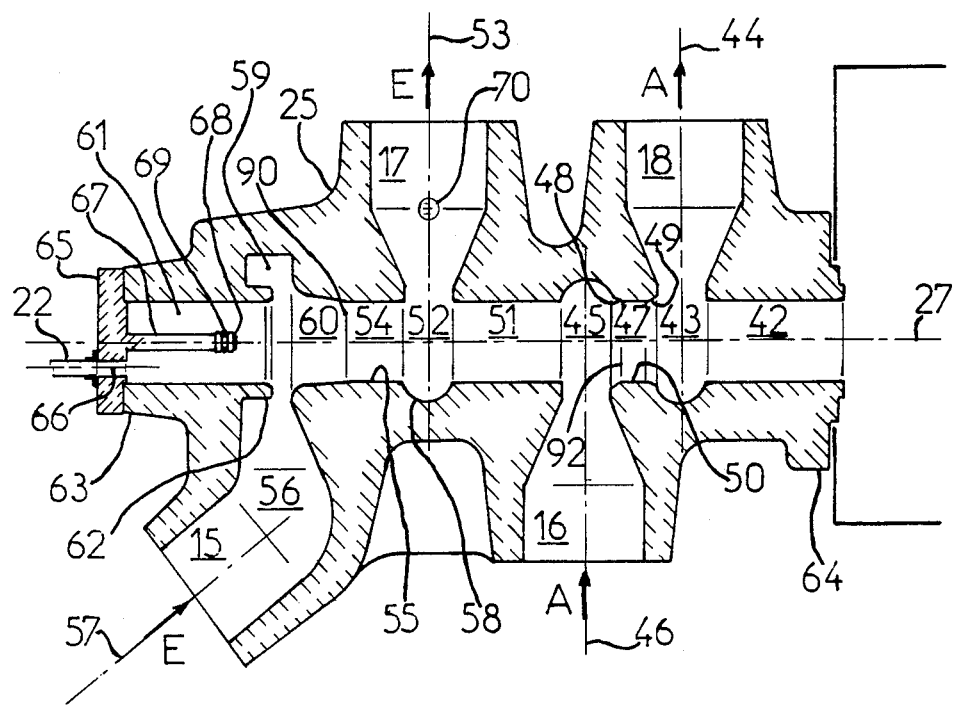
_fig.6_
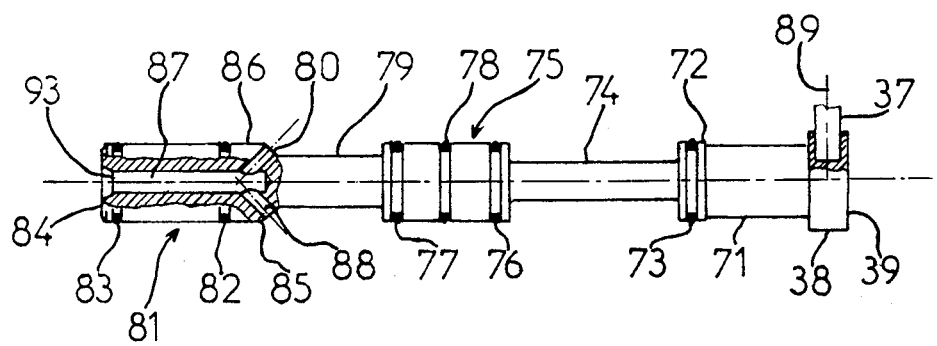
_fig.7_

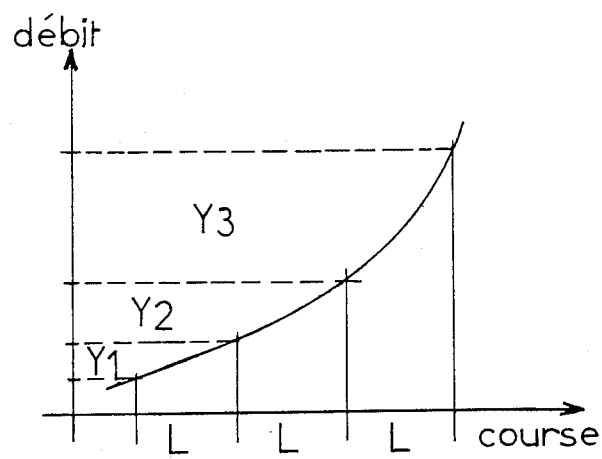
_fig.9_
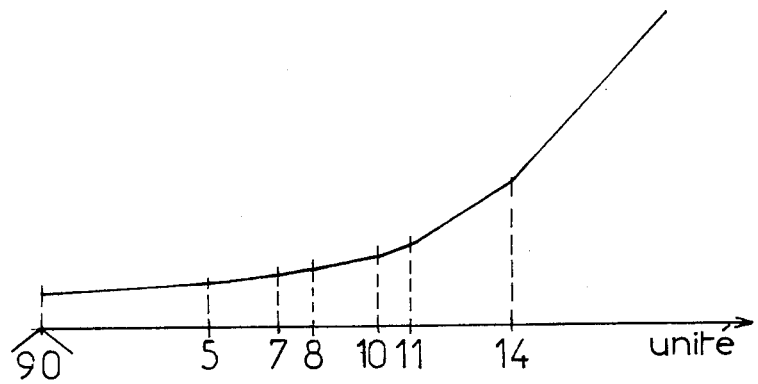
_fig.10_

SEQUENTIAL VALVE AND DRAIN FOR SNOW GUN

BACKGROUND OF THE INVENTION

The present invention relates to an improvement to the feed devices of snow guns in plants providing artificial snow for ski runs, such as those described, for example, the U.S. Pat. Nos. 3,706,614; 3,372,872 or 2,676,471.

The production of artificial snow for ski runs is performed in a known manner by spraying, in the chosen location, a mixture of air and water in the form of a mist, into the low-temperature ambient air by means of a snow gun and, in the case of a plant according to the present invention, by means of snow guns such as those described in the Pat. No. EP 80400504.9 on behalf of the Applicant.

In the existing artificial snow-making plants, the pressurized air and water are distributed via pipes situated along the runs which are to be covered with snow. The connections to the snow guns are made by means of shelters arranged along these pipes and at intervals of approximately thirty to fifty meters.

As a result of the development of new methods, it has been possible to envisage developments in the operation of snow-making plants for ski runs; the document EP-A-0,004,803 outlines the possibilities for these developments and, in fact, new means have been implemented in that field.

Selection of the runs and start-up of the plant are performed by a central computer which takes into account the temperature at various points along the run. The only prior manual operation arises in connection with selection of the guns which will be used in order to replenish a certain section of the run which is particularly worn for example; this manual operation consists in opening the valves for the air and for the water inside each selected shelter, before commencing start-up of the plant.

In view of the significant and foreseeable variations in the temperature along the runs, it often happens that the temperature conditions of the chosen zone prevent the plant from being started up and the plant remains inoperative whereas it could have been functioning normally in an adjacent zone or on another run.

The present invention aims to overcome the drawbacks of existing plants.

SUMMARY OF THE INVENTION

A first object of the invention is to eliminate the manual operations performed by operators inside the shelters arranged along the run, which lead to a reduction in the plant's output; these manual operations more often than not involve difficulties, on account of the climatic conditions, and are very costly.

Another object of the invention is to ensure better use of the climatic conditions and in particular of the temperature so as to be able to produce a maximum amount of snow at every point along the runs; it is known, in particular, that the temperature influences greatly the amount of snow produced and that this amount produced by a gun at a temperature of $-4°$ C. may be practically doubled at a temperature $-20°$ C.

Another object of the invention is to provide a plant with a greatly increased snow-production capability owing to the possibility of arranging and monitoring a very large number of guns along the edges of the runs.

Another important object of the invention is to provide a plant which does not represent a limited investment, in view of the very large number of guns which can be used.

In order to achieve these objects, the invention proposes a new feed device for snow guns; this device is located inside each shelter, along the run, and consists of a multiple-function slide distributor valve connected to the pressurized air and water pipes so as to feed a snow gun.

Slide distributor valves are known devices, which can be used for various applications and have widely varying forms. The document FR-A-966,043, for example, relate to the particular application of a slide distributor valve used for automatically controlling heat generators.

Another document, U.S. Pat. No. 2,011,329 relates to a valve consisting of a mixing tap connected to hot water and cold water pipes.

German Pat. No. DE-A-2,551,180 describes a valve consisting of modular parts.

All these documents describe the different possibilities of a slide distributor valve, and these possibilities are exploited according to the invention so as to enable the distributor valve to perform the following functions:
supply the snow gun with air;
supply the snow gun with water;
bleed the snow-gun supply circuit, using the distributor valve.

According to another arrangement of the invention, the feed device comprises means for automatically actuating the slide of the distributor valve; these means consist of a slide operating device, such as an electric geared motor, and a system for automatically controlling the operating device.

According to the invention, the slide distributor valve consists, on the one hand, of an elongated body provided with inlet and outlet nozzles or ports arranged preferably in the same plane passing through the longitudinal axis of the body of the said distributor valve and provided with a bleed orifice and, on the other hand, of a cylindrical slide sliding inside the body and provided with cylindrical obturators so as to control the flow of the water, air and drainage streams which pass through the body of the distributor valve.

According to a preferred arrangement, the air stream passes through the end part of the distributor valve body located on the same side as the slide operating device, and the bleed orifice is located at the other end of the body.

The body of the distributor valve has a cylindrical sections through which the water stream and air stream pass and which co-operating with the cylindrical obturators on the slide and, according to one arrangement of the invention, the distance separating the upstream edges of the cylindrical sections through which the water stream and air stream pass inside the body is greater than the distance, which is a function thereof, separating the seals of the pressurized air and water obturators of the slide, so as to produce a delay in opening of the water supply in relation to opening of the air supply.

According to a preferred arrangement of the invention, the water obturator comprises, downstream of the seal, a cylindrical portion which produces a considerable loss of heat and the length of which is substantially equal to one third of the travel of the slide, so that the water stream is established gradually through the distributor valve.

According to another arrangement of the invention, bleeding is performed by connecting the water outlet nozzle of the distributor valve with the outside, via a cylindrical cavity in the slide and flow orifices passing through the slide and emerging in the volute of the outlet nozzle, which cylindrical cavity is closed off by a cylindrical stem integral with the body; the distance separating the seal of the cylindrical stem from the upstream edge of the water-stream flow section is greater than the distance separating the entry edge of the cylindrical cavity of the slide from the seal of the air-stream flow obturator and the distance separating the seal of the cylindrical stem is less than the distance separating the entry edge of the cylindrical cavity of the slide from the seal of the water-stream flow obturator, so as to produce a delay in closing of the bleed orifice in relation to opening of the air supply, this delay being, however, less than the delay in opening of the water supply in relation to the same opening of the air supply.

So that the plant is able to operate more efficiently, in particular under certain temperature conditions, the distributor valve performs a complementary function consisting in automatically regulating the flow-rate of the water intended for the gun.

According to the invention, the means for regulating the water flow-rate consist essentially, inside the distributor valve body, of a part which has a variable cross-section and is in the form of a flared duct increasing in the downstream to upstream direction and which, in conjunction with the downstream edge of the water-stream flow obturator, restricts the said water stream, in front of the cylindrical passage which is bordered by upstream and downstream edges.

According to a preferred arrangement of the invention, regulation of the flow-rate of the water stream passing through the distributor valve is performed by means of controlled displacement of the slide inside the distributor valve body, and the water-stream flow section is such that, for an equivalent displacement of the slide, the percentage increase in the flow-rate is constant whatever the pressure of the feed water. This feature means that the same distributor valve can be used for different types of guns with outputs which may have widely varying ratios, of the order of 1 to 10.

According to another arrangement of the invention, the feed device of the snow gun comprises a device for operating the slide of the distributor valve. This operating device consists of a bidirectional electric geared motor. This geared motor operates the slide by means of a screw engaging in a threaded bore in the end of the slide.

According to the another arrangement of the invention, the screw operating to the slide comprises a thrust bearing which enables the operating torque of the slide to be reduced.

According to another arrangement of the invention, the slide is fixed, partially in rotation, by means of a pin guided in a longitudinal aperture, which pin co-operates with a device for indicating the position of the slide.

According to a preferred arrangement of the invention, the device for operating the slide is arranged inside a housing integral with the end of the body of the distributor valve.

The electric gear motor is operated, according to the invention, by means of an automatic control system consisting of a central computer for controlling the amount of now produced for the runs, which is connected, by means of a line, such as telephone line, to electronic conversion modules arranged inside the housings of the gun feed devices.

According to the invention, these electronic conversion modules comprise essentially a modem, an analog/-digital converter and logic inputs and outputs, all of which is controlled by a microprocessor with a permanent memory of the EPROM type. The logic power outputs are connected to the device for operating the slide of the distributor valve; the logic inputs are connected to the position and end-of-travel indicator arranged inside the housing; the analog inputs receive the signals of the pressure sensor arranged inside the water outlet nozzle of the distributor valve, and of the temperature and humidity sensors arranged in the vicinity of the snow gun.

The invention also relates to the plant comprising, on the one hand such a snow-gun feed device and, on the other hand, the assembly which enables the said feed device to be remote-controlled and consists in particular of the electronic conversion modules each connected to a single telephone line which is connected to a computer by means of an interface.

Thus, the invention enables the snow guns to be fed, without having to move one or more operators to each of the shelters; the central control computer takes into account all the parameters linked with operation of the snow gun(s) and, in accordance with these parameters, selects the guns and starts up the motor-pump and motor-compressor units. As a result of the computer, it is also possible to modify, in accordance with the temperature, the water flow-rate of each gun and, in accordance with the number of snow guns to be used, modify the choice of the guns so as to adapt this choice to the capacity of the motor-pump and motor-compressor unit.

DESCRIPTION OF THE DRAWINGS

The invention will be better understood with the aid of the description and attached drawings, given by way of example, in which:

FIG. 6 is a cross-sectional view of the body of the distributor valve, FIG. 7 is a view, partially in cross-section, of the slide of the distributor valve, FIG. 9 is a graph showing the water flow-rate as a function of the effective travel of the slide for three different type of guns, FIG. 10 shows the profile of the restriction chamber of the distributor valve body, for the water-stream flow.

DESCRIPTION OF THE PREFERRED EMBODIMENTS

Figure 1:
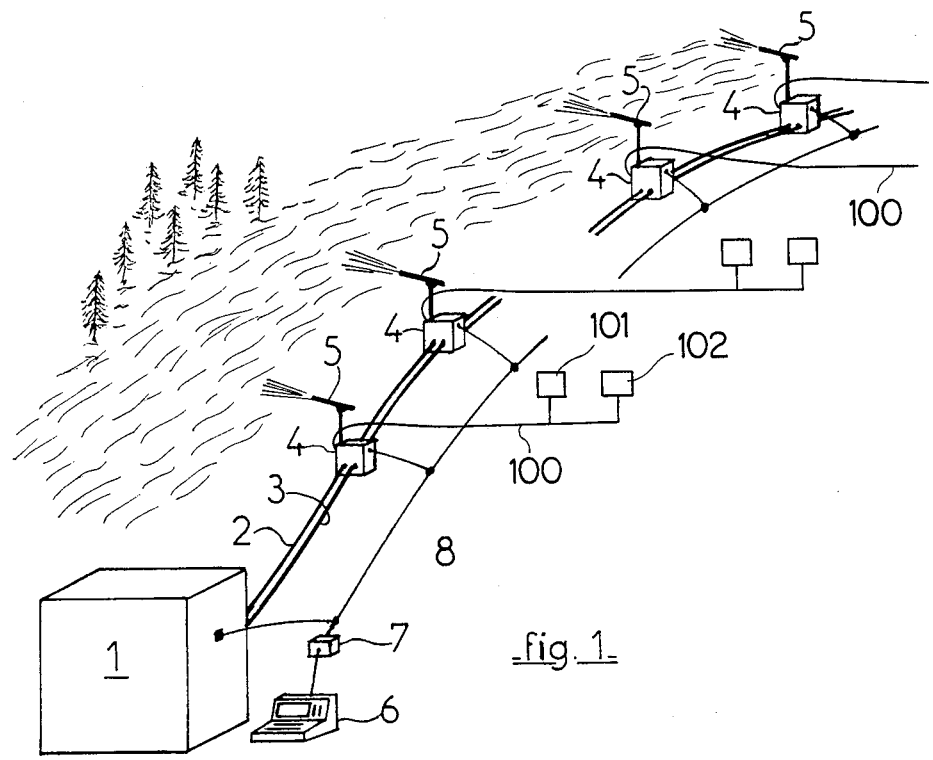
FIG. 1 is a diagrammatic illustration of a plant according to the invention, for providing a ski run with artificial snow.

As shown in FIG. 1, the snow-making plant has a machine room 1 containing the motor-pump and motor-compressor units which supply pressurized air and water to the pipes 2 and 3 arranged along the run to be provided with snow.

Along the pipes 2 and 3 there are shelters 4 which are located at intervals of approximately thirty to fifty meters and which facilitate, on the one hand, the connections to be made to the snow guns 5 and, on the other hand, protect and prevent freezing of these same connections and the accessories linked with operation of the guns 5.

A central computer 6 for controlling the production of snow for one or more runs is connected by means of an interface 7 and a specialized line 8 of the telephone line type to electronic conversion modules (shown in FIG. 2) arranged inside the machine room 1 and inside each shelter 4.

The plant also comprises temperature and humidity sensors 101 and 102, respectively, as illustrated in FIG. 1.

These sensors are arranged at each shelter 4 along the entire length of the runs, in the immediate vicinity of the snow guns 5. The signals from these sensors are sent to the computer 6 which controls and operates snow production along all the runs. In particular, in accordance with the temperature data which it receives, the computer selects the guns which are able to operate; it also starts up, inside the machine room 1, the motor-pump and motor-compressor units and actuates automatic feeding of the selected guns.

Figure 2:
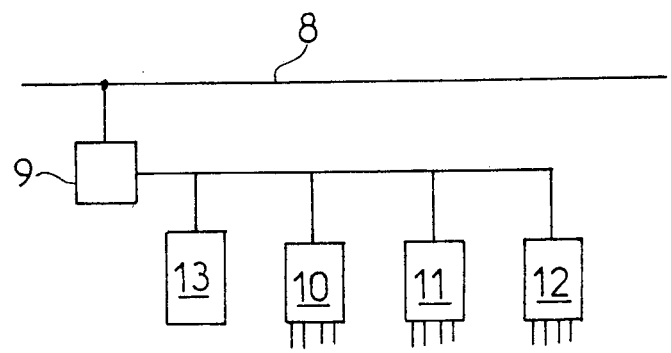
FIG. 2 is a block diagram of the electronic conversion module arranged inside the shelter.

The electronic conversion module is shown diagrammatically in FIG. 2; it consists essentially of a modem 9 connected to the specialized telephone line 8, of an analog/digital convertor 10, of logic inputs 11 and outputs 12, all of which is controlled by a microprocessor 13 whose program is recorded in an EPROM-type permanent memory. The analog/digital convertor 10 has several input channels for analog signals arriving from pressure, temperature and humidity sensors. The logic input 11 is connected to the feed device. The sensor and logic input signals are sent to the computer 6 which, in reply, and in accordance with its snow-production program and by means of the logic outputs 12 of the corresponding electronic conversion module(s), activates, on the one hand, the motor-pump and compressor units in the machine room 1 and, on the other hand, the feed device(s) 14 (shown in FIG. 3) of the chosen gun(s) 5.

Depending on the capacity of the transmission logic, a very large number of shelters may be provided. In the case of an eight-bit transmission logic, for example, 255 shelters may be provided, which is equivalent to covering approximately ten kilometers. Also, it is possible to provide, taking into account the length and overlapping of the runs, signal regeneration devices.

Figure 3:
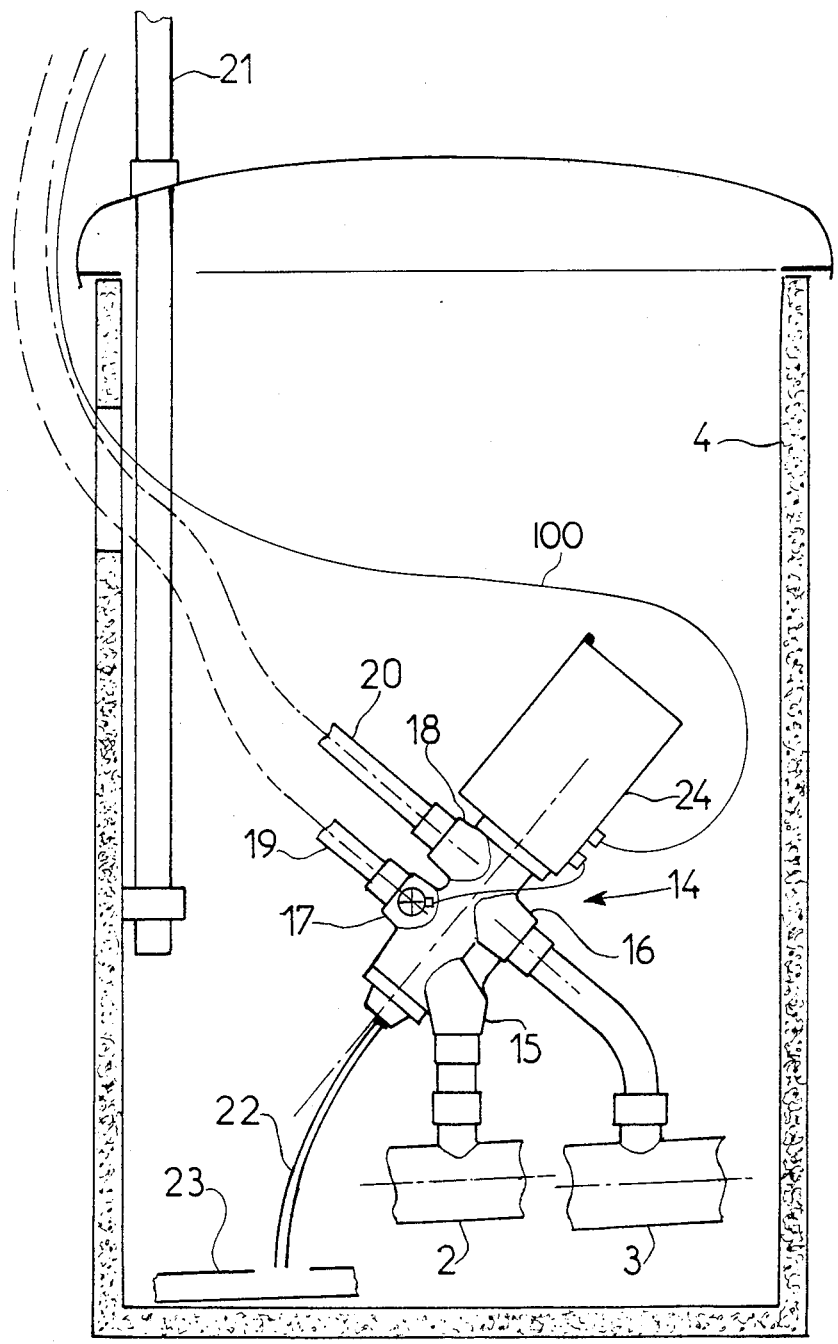
FIG. 3 is a diagrammatic illustration of a shelter, in cross-section, which is arranged along the run and contains a gun feed device according to the invention.

FIG. 3 shows, in diagrammatic form, a shelter 4 through which the pressurized air and water pipes 2 and 3 pass. This shelter 4 contains a device 14 for feeding a snow gun; this device 14 is connected, via its inlet nozzles 15 and 16, to the water pipe 2 and air pipe 3, respectively; the water and air outlets 17 and 18 of the device 14 are connected to the snow gun by means of flexible tubes 19 and 20. The snow gun is mounted on a pole 21 integral with the shelter.

The feed device 14 also has means which enable the supply tube 19 of the gun 5 and the gun itself to be bled. Draining of the tube 19 of the gun 5 and of the feed device 14 is performed by means of gravity, the water flowing through the tube 22 into the drainage pipe 23 which collects the water trickling down, at the bottom of each shelter 4. The feed device 14 is shown in an inclined position, at an angle of the order of 45°, to as to allow it to be completely emptied by means of gravity and avoid any risk of it becoming frozen. Provision is also made for the arrangement around, or in a cavity, inside the body of the feed device 14, of a heating means (not shown) such as a rod, which makes it possible to lessen or eliminate altogether the risk of freezing. The electronic conversion module (FIG. 2) is preferably accommodated inside a housing 24 arranged so as to form an extension at the top of the feed device 14.

Figure 4:
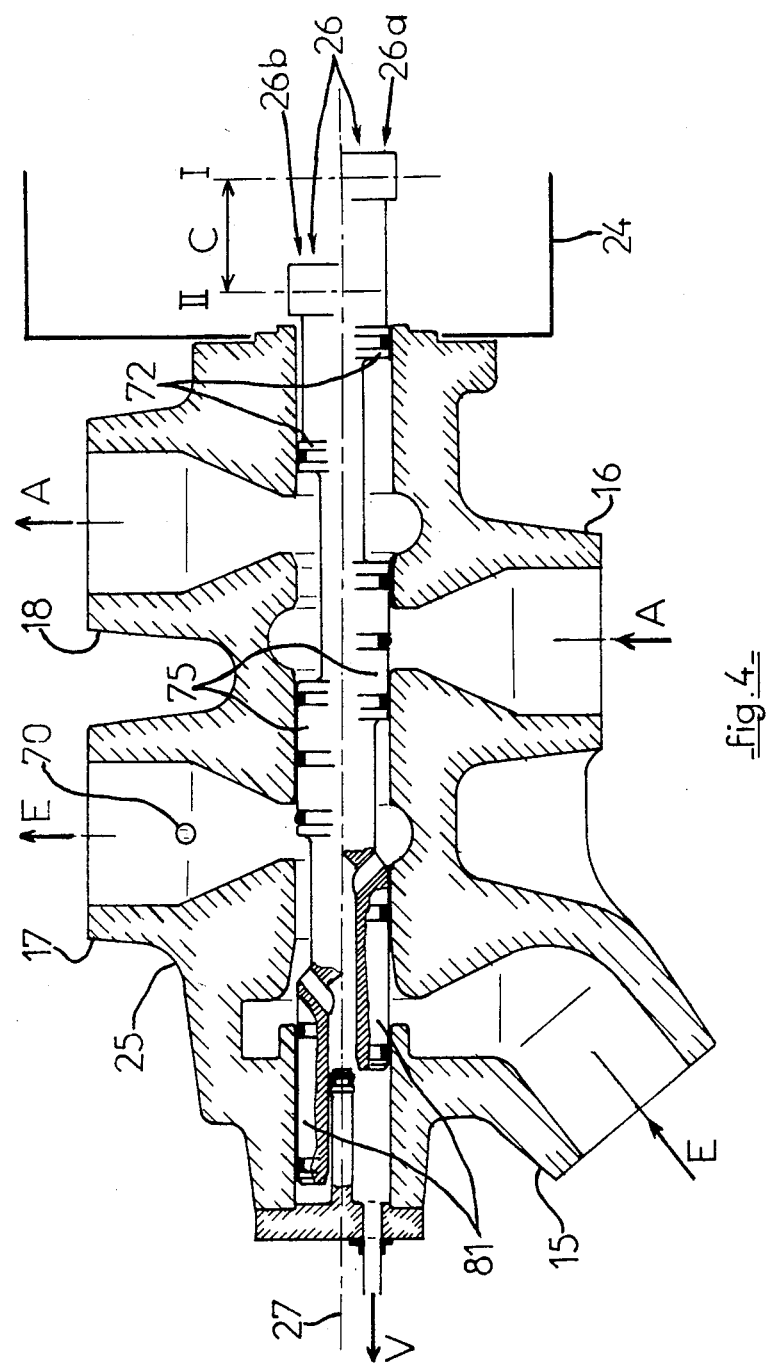
FIG. 4 is a cross-sectional view of the slide distributor valve for feeding a snow gun.
Figure 5:
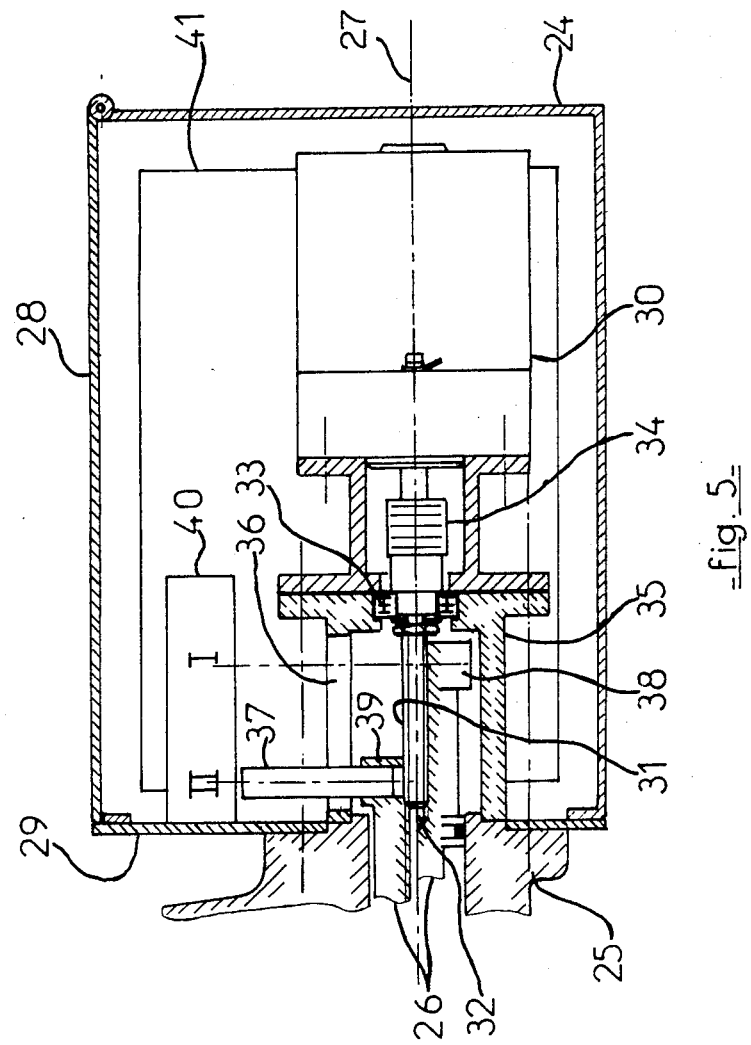
FIG. 5 is a digrammatic view, in cross-section, of the device for operating the slide.

The feed device 14 is shown in FIG. 4; it is in the form of a slide distributor valve comprising a body 25 and a slide 26 operated by means shown in FIG. 5, which means are arranged inside the housing 24.

The air stream (A), water stream (E) and drainage water stream (V) pass through the body 25 of the distributor valve. The air and water stream inlets and outlets are arranged in the same plane which passes through the longitudinal axis 27 of the body 25 and of the slide 26.

The part of the body 25, through which the air stream passes, is located preferably on the side where the housing 24 is located so that, in the event of leakage between the distributor valve and housing, there is no risk of damage to the electric and electronic components contained inside the said housing 24. The different streams are separated by separation zones on the body 25, which zones co-operate with cylindrical valves of the slide 26.

The slide 26 is shown in two halves; the one-half 26a is shown in the active position for closing the water stream (E) and air stream (A) and for opening the drainage stream (V); the one-half 26b of the slide 26 is shown in the active position for opening the water stream (E) and air stream (A) and for closing the drainage stream (V). Between these two limit positions I and II which correspond, respectively, to the position for closing the water and air streams and to the position for opening the same water and air streams, the overall travel C of the slide can be divided into a series of successive travel sections which correspond to implementation of the various functions of the distributor valve.

Displacement of the slide 26 from position I to position II is performed at a very slow speed by means of an actuating device (FIG. 5) arranged inside the housing 24. This housing 24 has an inspection flap 28 on the top and is mounted on the body 25, by means of a plate 29, so as to enable the said housing 24 to be assembled and disassembled more easily.

The device for operating the slide 26 consists of an electric, bidirectional, geared motor 30 which drives a screw 31 for operating the slide 26, which slide has axially, at its end, a threaded bore 32. The screw 31 is preferably mounted on a thrust bearing 33, in order to reduce the operating torque of the slide 26, and is integrally fixed to the geared motor 30 via a coupling 34. The support piece 35 for the thrust bearing 33, which is fixed to the body 25 of the distributor valve, has an aperture 36 which is arranged longitudinally and inside which a pin 37 slides, which pin partially locks in rotation the slide 26. The length of the aperture 36 is greater than the travel of the slide 26. The pin 37 is arranged, perpendicular to the axis 27, inside a flange 38 which forms the end 39 of the slide 26. The pin 37 extends beyond the aperture 36 and activates an indicator 40 which indicates the position and more particularly end of travel of the slide 26. This indicator 40 is accommodated inside the housing 24, on the front plate 29, integral with the body 25 of the distributor valve.

The end-of-travel indicator 40 of the slide is connected to the electronic conversion module 41 arranged inside the housing 24; it is connected to the logic input 11 of the electronic conversion module (FIG. 2). This logic input 11 is provided so as to receive the data from two feed devices of the snow gun 5.

The body 25 of the distributor is shown (FIG. 6) without the slide 26. This body 25 has, at the end receiving the housing 24, a cylindrical, axial, separation zone 42 between the outside and the air stream (A) and, more particularly, the air-stream outlet volute 43 which is extended by the outlet nozzle or port 18; the outlet volute 43 and the nozzle 18 are aligned in accordance with the same mid-plane 44 perpendicular to the longitudinal axis 27 of the body 25. The inlet nozzle or port 16 for the air stream (A) is also extended by a volute 45, both of which are aligned in accordance with a mid-plane 46 perpendicular to the longitudinal axis 27 of the body 25. The two volutes 43 and 45 are separated by an axial air passage 47; the length of the air passage 47 is substantially equal to one-half of the travel of the slide. This passage 47 has, on each side, chamfers 48 and 49 which define a cylindrical zone 50 acting as a seat; the length of this zone 50 is substantially equal to half of the length of the passage 47.

An axial cylindrical zone 51 separates the water stream (E) and air stream (A) inside the body 25; the length of this zone 51 is, in the example described, slightly greater than the travel C of the slide.

Beyond this separation zone 51, still in the direction away from the housing 24, there is a water outlet volute 52 extended by the outlet nozzle or port 17; the nozzle 17 and the volute 52 are aligned in accordance with the same mid-plane 53 perpendicular to the longitudinal axis 27 of the body 25. There then follows an axial cylindrical passage 54 for the water stream (E), the outer casing 55 of which forms the seat for closing off the said water stream. The length of the cylindrical passage for the water stream is substantially greater than that of the cylindrical passage 47 for the air stream. Upstream of the cylindrical passage 54, there is the water inlet volute 56 which forms an extension of the water inlet nozzle or port 15. The water inlet nozzle 15 is centered about an axis 57 which forms an angle of the order of 45° with the longitudinal axis 27 of the body 25 so that the distributor valve is in an inclined position, as shown in FIG. 3. The purpose of this inclined position is to enable the body 25 of the distributor valve and, more particularly, the bottom 58 of the water outlet volute 52 to be drained completely or almost completely. The annular part 59 of the water inlet volute is extended by a flared duct 60 which reaches as far as the cylindrical passage 54. This flared duct 60 is centered about the longitudinal axis 27 and its role will be explained below. The cross-section of the flared duct decreases in an upstream to downstream direction, and the profile of the said flared duct will also be described in more detail below.

After the water-stream inlet volute 56 that is an axial, cylindrical, separation zone 61 which isolates the said voltage 56 and extends to the end of the body 25 of the distributor valve. The entry to the cylindrical zone 61 has a flange 62 which extends into the annular part 59 of the volute by an amount substantially greater than half of the axial length of the said annular part 59. The length of the cylindrical separation zone 61 is of the same order as that of the separation zone 42, that is to say greater than the travel C of the slide 26.

The end 63 of the body 25, opposite the end 64 supporting the housing 24, has a cover-piece 65 which is integrally fixed to the said end 63 with the aid of any suitable means. This cover-piece 65 is provided with a drainage orifice 66 communicating with the outside by means of the tube 22 (FIG. 3) which guides the drainage water stream V into the pipe 23.

So as to ensure that the body 25 of the distributor valve is drained completely, the bleed orifice 66 is arranged at the bottom of the cover-piece 65.

The cover-piece 65 also has a cylindrical steam 67 centered about the longitudinal axis 27 which extends inside the cylindrical separation zone 61. This stem 67 is provided, as its end, with an obturator 68 and an annular seal 69.

The diameter of the obturator 68 is of the order of a third of the diameter of the cylindrical separation zone 61. The distance separating the cover-piece 65 from the seal 69 is substantially greater than the travel C of the slide 26. The end 63 of the body 25 may be made so as to be separate from the said body so as to enable, in particular, the flared duct 60 to be machined more easily. In this case, the end 63 would be in the form of a cylindrical sleeve which would include the entire cylindrical separation zone 61.

The body 25 also has, inside the outlet nozzle 17 for the water stream (E), an orifice 70 intended to receive a pressure sensor which will be connected to the electronic conversion module 41 arranged inside the housing 24 and, more particularly, to the analog/digital converter 10 (FIG. 2) of the said electronic conversion module. It should be noted that the analog/digital converter 10 may be provided so as to receive the signals from two pressure sensors of two feed devices which are located in the vicinity of each other inside the same shelter 4 and which are intended to supply two snow guns 5.

The cylindrical separation zones 42, 51, 61 and the cylindrical passages 47, 54, are centered about the longitudinal axis 27 of the body 25, and the diameter of these zones and of these passages is preferably identical.

The slide 26 which moves inside the separation zones 42, 51, 61 and the passages 47, 54, is shown in FIG. 7.

Starting from the end 39 of the slide 26, there is the cylindrical flange 38 inside which the pin 37 for partially locking the slide in rotation is positioned. The diameter of the flange 38 is substantially greater than the diameter of the separation zone 42 of the body 25.

An extension to this flange is then formed by a cylindrical stem 71 with a diameter substantially less than the diameter of the separation zone 42 of the body 25 and with a length equal approximately to the travel C of the slide. At the end of this stem 71 there is an obturator 72 provided with an annular seat 73. This obturator 72 is located inside the separation zone 42 of the body 25 and permanently isolates the air-stream outlet volute 43 from the outside, at the end where the housing 25 is located.

Beyond the obturator 72 there is a stem 74, the diameter of which is close to half the diameter of the obturator 72 and the length of which is equal to the travel C plus at least the axial length of the air-stream outlet volute 43 in the region of the axis 27 of the body 25.

The stem 74 connects the obturator 72 to a cylindrical obturator 75 of the same diameter. This obturator 75 has two main functions: it ensures that the passage 47 for the air stream A is closed, thus cutting off the air supply to the snow gun, and it ensures that the air stream A and water stream E are isolated from each other and, more particularly, that the inlet for the air stream A in the region of the volute 45 and the outlet for the water stream E in the region of the volute 52 of the body 25 are isolated from each other.

The obturator 75 has two annular seals 76 and 77 arranged at each of its ends and a central annular seal 78. The distance separating the two end seals 76 and 77 is substantially equal to the travel C of the slide 26.

Beyond the obturator 75 there is another cylindrical stem 79, the diameter of which is of the order of two thirds of the diameter of the obturator 75 and the length of which is equal, in the example shown, to twice its diameter. In fact, this length of the stem 79 is a function of the length of the separation zone 51 of the body 25.

A conical part 80 forms an extension of the stem 79 and connects the said stem to a cylindrical obturator 81. The half angle at the top of the conical part is of the order of 45°. The cylindrical obturator 81 performs several functions. Firstly, it has two annular seals 82 and 83, one of which, the seat 83, is located at the end 84 of the slide 26. This annular seal 83 permanently isolates the water inlet volute 56 from the outside, by moving inside the cylindrical separation zone 61 of the body 25. The second annular seal 82 is set back in relation to the downstream edge 85 of the obturator 81 in the region of the conical part 80; the distance separating the seal 82 from the edges 85 is substantially equal to the radius of the obturator 81. The role of the cylindrical zone 86 situated between the seal 82 and the edge 85 of the obturator 81 will be explained below.

The obturator 81 also has an axial cylindrical bore 87 which leads, by means of at least one bored orifice 88, to the conical connecting part 80. Preferably, several orifices 88 are provided, the axis of one of which is arranged in the plane which passes through the axis 89 of the pin 37 for positioning the slide 26 in relation to the body 25, this axis 89 being located in the plane passing through the longitudinal axis 27 of the body 25 and through the axis 57 of the water-stream inlet nozzle 15.

The two ends 38 and 84 of the slide 26 communicate with the outside, thereby making it possible to balance it and reduce the forces required to move the latter inside the body 25.

Figure 8:
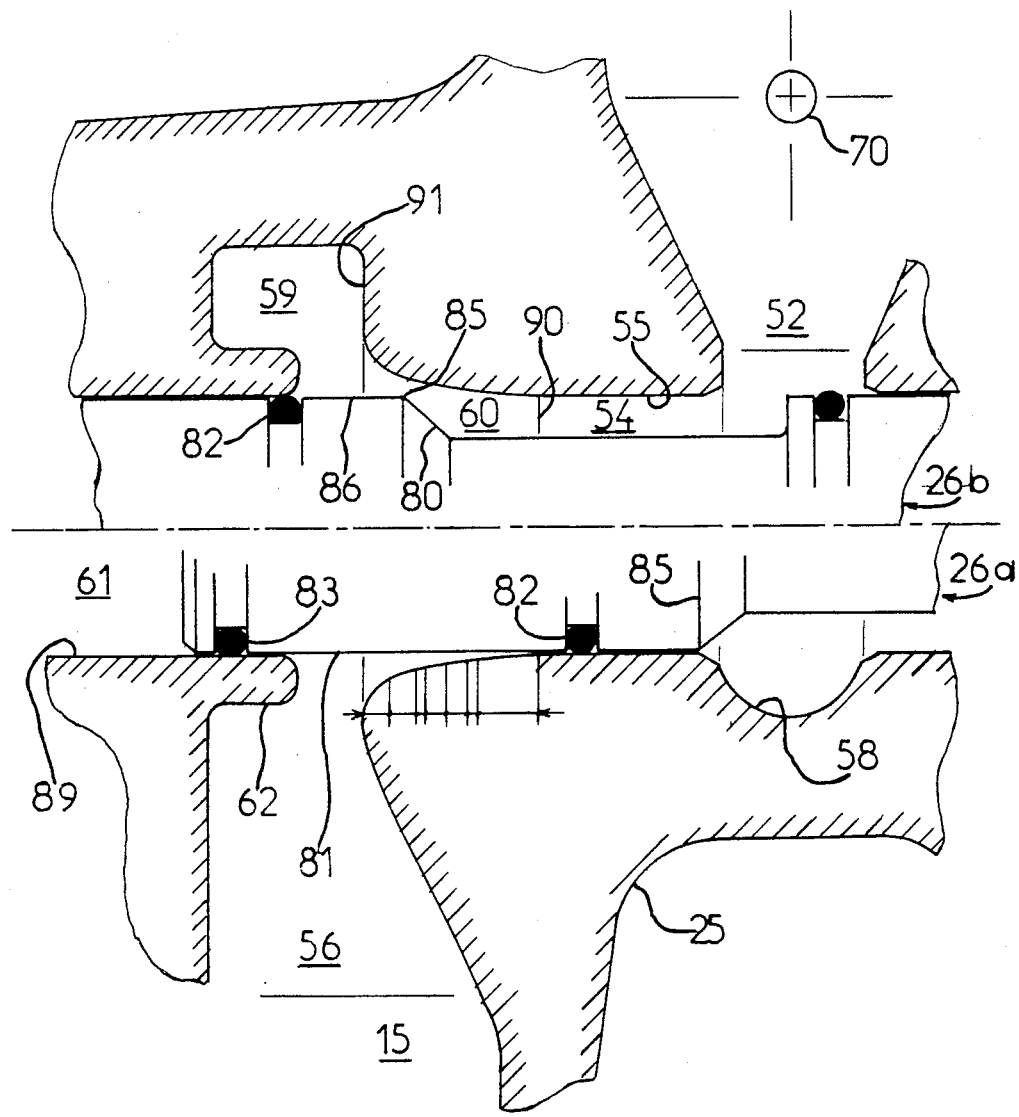
FIG. 8 is a partial view, in cross-section, of the distributor valve, showing the water-stream flow zone, without the bleeding device.

FIG. 8 shows in detail and in cross-section the part of the slide distributor valve through which the water stream E passes. This part has means which enable several functions to be performed, i.e. in particular a closing function and a water flow-rate regulating function.

The slide 26 is shown in two halves 26a and 26b; the part 26a of the slide is in the position for closing off the water inlet E; the part 26b is in the position for opening the water inlet E.

The water stream E passing through the body 25 is stopped by means of the obturator 81 and its two annular seals 82 and 83 which are, respectively in an active position on the surrounding shell 55 of the cylindrical passage 54 and on the wall 89 of the cylindrical separation zone 61.

The flow-rate of the water passage through the body 25 is regulated by restricting the water stream between the edge 85 of the obturator 81 and the flared duct 60 which forms an extension of the annular part 59 of the volute 56 and precedes the cylindrical passage 54. The water-stream flow section between the flared duct and the edge 85 varies as the slide 26 of the distributor valve is moved inside the body 25.

The effective travel of the slide for regulating the water flow-rate starts when the edge 85 of the obturator 81 reaches the imaginary edge 90 separating the flared duct 60 and the cylindrical passage 54 and ends when the edge 85 approaches the vertical entry plane 91 of the flared duct 60.

Between the positions of the obturator 81 where the seal 82 is in an inactive sealing position, i.e., upstream of the edge 90 of the body, and the position where the edge 85 reaches the edge 90, a significant loss of head is achieved inside the cylindrical passage 54 between its surrounding shell 55 and the cylindrical part 86 of the obturator 81. This loss of heat varies as the slide 26 is moved and enables the effective water flow-rate to be gradually established across the body. Reduction of the steam's pressure downstream of the edge 85 is performed with a very low noise level and, when the bleed point is fully open, the loss of head is minimal.

When the water flow-rate begins to establish itself across the body 25, i.e. when the edge 85 of the obturator 81 is located upstream of the edge 90 of the said body 25, the seal 82 of the said obturator 81 is clearly located upstream inside the flared duct 60 and is set back sufficiently so as to avoid the danger of being dislodged by the water stream. When high flow-rates are achieved, i.e. when the slide 26 is in the fully open position, the seal 82 is protected when entering inside the cylindrical separation zone 61 and, more particularly, inside the flange 62 which is arranged so as to form an extension of the said separation zone 61. The seal 82 will preferably be a seal with high mechanical strength.

FIG. 9 shows the results obtained when the slide 26 is displaced inside the body 25 in order to vary the flow-rate of the water feeding the snow gun connected to the output of the distributor valve. With the use of snow guns according to European Pat. No. 80 400504.09 of the Applicant, a substantially constant flow-rate ratio is obtained, whatever the pressure of the water stream. By way of example, FIG. 9 shows three types of snow gun: Y1, Y2, Y3, the flow-rates of which may vary from 1:1 to 2:1.

Thus, the small gun Y1 has a flow-rate which may vary from 2.5 to 5 m³/h, the medium-sized gun Y2 has a flow-rate which may vary from 5 to 10 m³/h and the large gun Y3 has a flow-rate which may vary from 10 to 20 m³/h.

It can be seen in FIG. 9 that the flow-rate of the different types of guns Y1, Y2, Y3 is varied with the same effective travel L of the slide 26 inside the body 25 of the distributor valve. Owing to the fact that the flow-rate can be automatically varied for each gun, it is possible to take full advantage of the favourable temperature conditions and, in particular to double the quantity of snow produced, when the temperature passes from −4° to −20° C. for example.

This result is achieved more particularly by the profile of the flared duct 60 of the body 25. The flared duct 60 (FIG. 8) is divided into a certain number of segments in the form of a truncated cone, between the edge 90 of the body and the entry plane 91 of the said flared duct 60. An example of embodiment of the flared duct 60 is shown in FIG. 10 which illustrates the half-angle at the top of successive truncated cones as a function of the distance in relation to the edge 90, expressed in units of length. Thus, from the edge 90 and over a distance of five units, the half-angle is 1.8°; from five to seven units from the edge 90, the half-angle is 2.6°; from seven to eight units from the edge, the one half-angle is 8.8°; from eleven to fourteen units from the edge, the half-angle is 45° and the truncated cone is connected to the annular part 59 of the inlet nozzle 56. The angles connecting the truncated cone are rounded off so as to achieve better continuity in the profile of the flared duct 60. The fourteen units of length correspond substantially to the radius of the obturator 81.

The mode of operation of the distributor valve and, more particularly, the way in which the functions of the distributor valve are implemented are as follows:

The travel C of the slide consists of a series of successive stages; at each stage, which corresponds to a precisely determined travel section, a particular function of the distributor valve occurs and all of the functions follow on automatically with great precision and perfect reliability.

Thus, starting from position I (FIG. 4), i.e. the position in which the water and air streams are shut off, the first stage after a certain distance traveled C1 corresponds to the air stream no longer being sealed; the seal 76 of the obturator 75 has passed from an active sealing position on the wall 50 of the cylindrical passage 47 to an inactive sealing position in the region of the chamfer 48. The next stage, occurring after a total distance traveled C2, corresponds to closing of the bleed orifice by bringing the seal 69 of the stem 67 into an active position inside the cylindrical cavity 87 of the slide 26. Consequently, the distance which separates, on the body 25, the seal 69 from the edge 92 of the chamfer 48, bordering the wall 50 of the passage 47, is greater than the distance which separates, on the slide 26, the seal 76 from the edge 93 at the entrance to the cylindrical cavity 87; this difference gives rise to a delay in closing of the bleed orifice in relation to admission of the air stream, and, vice versa, it gives to an advance in opening of the bleed orifice in relation to shutting off of the air stream when the slide 26 moves from II to I.

The stage which follows, after a total distance travelled C3, corresponds to the water stream no longer being sealed; the seal 82 of the obturator 81, on the slide 26, passes from the active sealing position downstream of the edge 90 of the body to the inactive sealing position upstream of the said edge 90. On the one hand, the distance which separates, on the body 25, the seal 69 from the edge 90 is substantially less and, at the most, equal to the distance which separates, on the slide 26, the seal 82 from the edge 93 at the entrance to the cylindrical cavity 87. On the other hand, the distance separating, on the body 25, the edge 90 and 92 is greater than the distance separating, on the slide 26, the seals 82 and 76. These arrangements produce, automatically, a delay in admission of the water stream in relation to admission of the air stream and in relation to closing of the bleed orifice. Vice versa, these arrangements provide an advance in shutting off of the water stream in relation to opening of the bleed orifice and shutting off of the air stream, when the slide 26 passes from the position II to the position I.

The following stage, after a total distance travelled C4, corresponds to the effective water flow-rate passing through the body 25; starting from this stage, and as far as the end position II where the air and water streams are completely open, the slide is moved depending on the type of snow gun used, so as to restrict the stream and provide the gun with only a given quantity of water.

This quantity of water is determined by the central controlling computer 6, depending on the type of gun and depending on the temperature in the vinicity of the gun. The water flow-rate determined by the computer 6 is achieved by displacing the slide 26 and more particularly its edge 85 inside the flared duct 60. In view of the fact that, with regard to the feeding of the snow guns of the Applicant with water, according to European Pat. No. 80 4000504.09, the relationship between the flow-rate and the pressure is laid down in a well-defined law, the flow-rate of the water feeding the snow gun is checked by means of the pressure sensor 70a positioned in the orifice 70 of the outlet nozzle 17 where the water stream is supplied to the snow gun.

The mode of operation of the snow-making plant which is shown in FIG. 1 and comprises the feed device 14, as described in conjunction with FIGS. 3 to 10, is as follows:

The central control computer has a snow-production program for the ski run(s), in the vicinity of which the snow guns are arranged.

The atmospheric conditions are recorded at each location and more particularly at each shelter 4 where at least one snow gun is provided. The temperature and humidity sensors are connected to the electronic conversion module 41 which is arranged inside the housing 24 of the device 14 for feeding the snow guns. The data recorded by the temperature and humidity sensors (101 and 102, respectively) are fed along line 100 to electronic conversion module 41 where they are converted so that they can be transmitted, in digital form, to the central computer 6 via a simple telelphone line 8 to which all the electronic conversion modules 41 of each shelter 4 are connected. The line 8 is connected to the computer via an interface 7 which again converts the digital data. The electronic conversion module also transmits to the central computer 6 data relating to the end-of-travel condition of the slide 26 of the distributor valve. Each data package arrives with the address of the sender, and the computer 6 stores this data.

When, in accordance with the snow-production program provided, the temperature and humidity conditions are reached, the central computer 6 first of all activates start-up, in the machine room, of the pumps, compressors and their auxiliary equipment. This start-up is achieved by means of the power outputs of an electronic conversion module of the same type as that used by the feed devices 14 and by means of the same telephone line 8, which means that one or more machine room may be provided, a required. The electronic conversion module of the machine room informs the computer 6 about the condition of the machines and the water temperature for example.

The computer also activates, where necessary, heating of the body 25 of each feed device 14.

When the pressurized air and water pipes 2 and 3 are under working pressure, the central computer 6 sends back to the modules 41 provided for this purpose, i.e. in the location where the snow-production conditions are favorable, the commands for opening of the corresponding slide distributor valves. Each electronic conversion module 41 actuates, by means of its power output 12, the geared motor 30 for operating the slide 26. The slide 26 is moved inside the body 25 until a water flow-rate is established inside the snow gun in accordance with the atmospheric conditions of the site where the gun is located. The flow-rate is checked by means of a pressure sensor arranged inside the water-stream outlet nozzle 17 of the distributor valve. The data recorded by the sensor is transmitted by means of the electronic conversion module 41 to the central computer 6 which, in reply issues the commands for maintaining the position of the slide 26 or modifying it. In order to start up the snow gun, the computer issues a command which, owing to the predetermined travel of the slide 26, enables the air supply to be opened; the water flow-rate is then regulated, also in accordance with the trend of the atmospheric conditions.

When the programmed quantity of snow has been achieved or when the atmospheric conditions are no longer favorable, the central computer 6 causes stoppage of the snow gun(s) which are in operation by issuing commands for closure of the electronic conversion modules 41 concerned. Each module 41 concerned, by means of its logic power output 12, causes the geared motor to operate the slide 26 so as to bring the latter into the position for shutting off the air and water streams and opening the bleed orifice, in order to drain the gun's water circuit.

The invention is not limited to the embodiment described; it embraces all the variations which are compatible with each of the attached claims.

Thus, the device for operating the distributor valve may consist of a pneumatic or hydraulic system controlled in the same manner. Similarly, the dimensions of the body of the distributor valve and of the slide may vary; the dimensions in the example described have been provided as such with a view to occupying a minimum amount of space and facilitating, moreover, machining operations.

The invention may also be used in other areas of application and more particularly in areas connected with the protection of the natural environment and of plants, wherever it would be advantageous to use an automatic sprinkling or spraying plant.

What is claimed is:

1. A feed device for a snow gun, comprising:
   (a) an elongated body, said body further comprising:
      (i) a water inlet port adapted to be connected to a source of water under pressure;
      (ii) an air inlet port adapted to be connected to a source of air under pressure;
      (iii) a water outlet port; and
      (iv) an air outlet port,
   wherein all of said ports have their longitudinal axes lying in a common plane passing through the longitudinal axis of said elongated body;
   (b) a longitudinal passage in said elongated body with each of said ports being in communication with said longitudinal passage, said longitudinal passage further comprising:
      (i) a first cylindrical flow section lying between said air inlet and said air outlet; and
      (ii) a second cylindrical flow section lying between said water inlet and said water outlet;
   (c) a drain orifice at one end of said longitudinal passage;
   (d) an elongated cylindrical slide mounted in said longitudinal passage for axial movement therein from a closed position to an open position and return;
   (e) valve elements on said slide for selectively controlling the flow of water and air through said device and for opening and closing said drain orifice, said valve elements further comprising:
      (i) a first valve element having a first sealing member thereon positioned to open and close said first flow section;
      (ii) a second valve element having a second sealing member thereon positioned to open and close said second flow section, said second valve element being configured so as to gradually increase the head of water flowing through said second flow section through substantially one-third of the length of travel of said slide between the closed and open positions,
   wherein said first sealing member is positioned to open said first flow section to the flow of air therethrough prior to the opening of said second flow section to the flow of water therethrough; and
   (f) operating means connected to said slide to selectively open and close said inlet and outlet ports and said drain orifice, and to bleed fluid from said passage when said slide is in a closed position, said operating means being responsive to a remote control system acting to automatically control the operation of said feed device in response to atmospheric temperature and humidity inputs without manual intervention, wherein said operating means is mounted at one end of said elongated body with said air inlet and air outlet ports located at the end of said elongated body adjacent said operating means and said water inlet and water outlets ports located adjacent the opposite end of said elongated body, whereby fluid will be drained from said passage through said drain orifice when said elongated body is mounted at a vertically inclined angle with said drain orifice lowermost.

2. The feed device claimed in claim 1 including an axial cylindrical cavity in said slide at the end thereof adjacent said drain orifice, and flow orifices in communication with said cylindrical cavity and positioned to bleed the fluid from said water outlet port when said slide is in the closed position.

3. The feed device claimed in claim 2 wherein said axial cylindrical cavity is adapted to receive a cylindrical stem projecting inwardly into said passage from the end of said body, and a seal on said stem positioned to close said cavity to the flow of fluid therethrough when said slide is displaced from its closed position.

4. The feed device claimed in claim 3 wherein said first and second seals and the seal on said cylindrical stem are positioned relative to each other so as to successively close the bleed orifice, open the air inlet and then open the water inlet as the slide is moved from closed to open position.

5. The feed device claimed in claim 1 including means in said passage for regulating the flow rate of inlet water flowing therethrough.

6. The feed device claimed in claim 5 wherein the means for regulating the water flow rate comprises a flared flow section between said water inlet and said second flow section adapted to be progressively opened as the second valve element is moved in a direction to open said water inlet to the flow of water therethrough.

7. The feed device claimed in claim 6 wherein said flared flow section is configured to provide a substantially constant percentage increase in the water flow rate at the slide is displaced.

8. The feed device claimed in claim 7 including pressure sensing means mounted in said water outlet.

9. The feed device claimed in claim 8 wherein said passage includes an annular flange positioned to protect the seal on said second valve element when said water inlet is fully opened.

* * * * *